United States Patent [19]

Yeates

[11] Patent Number: 4,673,768
[45] Date of Patent: Jun. 16, 1987

[54] SEPARATION OF POLYMER FROM HYDROCARBON SOLVENT IN THE MANUFACTURE OF POLYMERS OF ETHYLENE

[75] Inventor: John N. Yeates, Sarnia, Canada

[73] Assignee: Du Pont Canada Inc., Mississauga, Canada

[21] Appl. No.: 837,162

[22] Filed: Mar. 7, 1986

[51] Int. Cl.[4] .............................................. C10C 2/00
[52] U.S. Cl. .................................... 585/519; 585/809
[58] Field of Search ............... 585/832, 833, 838, 519, 585/809, 802

[56] References Cited

U.S. PATENT DOCUMENTS

| | | | |
|---|---|---|---|
| 2,017,325 | 10/1935 | Authruff | 585/519 X |
| 2,157,220 | 5/1939 | Schutt | 585/519 X |
| 2,171,928 | 9/1939 | Gase | 585/519 X |
| 2,180,361 | 11/1939 | Lassiat | 585/519 |
| 2,281,361 | 4/1942 | Leffer | 585/519 X |
| 2,351,123 | 6/1944 | Hays et al. | 585/519 |
| 3,149,178 | 9/1964 | Hamilton et al. | 585/519 X |
| 3,546,317 | 12/1970 | Gislon et al. | 585/519 X |

FOREIGN PATENT DOCUMENTS

| | | |
|---|---|---|
| 568721 | 1/1959 | Canada . |
| 660869 | 4/1963 | Canada . |
| 732279 | 4/1966 | Canada . |

Primary Examiner—Glenn Caldarola

[57] ABSTRACT

An improved method for the separation of polymer from hydrocarbon solvent in a process for the manufacture of poly-α-olefins is disclosed. A solution of polymer and solvent at a temperature above 130° C. and a pressure above atmospheric pressure is passed through pressure reduction means into a vessel. Solvent is flashed off and the polymer forms a pool of molten polymer. The temperature of the walls of the vessel above the pressure reduction means is maintained at least 10° C., and especially at least 30° C., above the temperature of the walls of the remainder of the vessel. The improved method is less susceptible to the formation of gel in the polymer.

11 Claims, 2 Drawing Figures

SEPARATION OF POLYMER FROM HYDROCARBON SOLVENT IN THE MANUFACTURE OF POLYMERS OF ETHYLENE

The present invention relates to a method for the separation of polymer from hydrocarbon solvent in a process for the manufacture of poly-α-olefins, and especially to an improved method for such separation that is less susceptible to the formation of gel in the polymer.

Polymers of ethylene, for example, homopolymers of ethylene and copolymers of ethylene and higher α-olefins, are used in large volumes for a wide variety of end uses, for example, in the form of film, fibres, moulded or thermoformed articles, pipe, coatings and the like. In many of these enduses it is important that the level of gel in the polymer be at a low level and moreover be consistently at a low level. As used herein, gel refers to that matter which remains after Soxhlet extraction of polyethylene using xylene as solvent and a 200 Tyler ® mesh wire screen in the extraction apparatus.

Processes for the preparation of homopolymers of ethylene and copolymers of ethylene and higher α-olefins are known. Such processes include processes in which the monomers are polymerized in the presence of a co-ordination catalyst, for example, a catalyst comprising a compound of a transition metal belonging to Groups IVB—VIB of the Periodic Table and an organometallic compound of a metal belonging to Groups I-IIIA of the Periodic Table.

There are two types of processes for the manufacture of polyethylene that involve the polymerization of monomers in the presence of a co-ordination catalyst viz. those processes which operate at temperatures below the melting or solubilization temperature of the polymer and those processes which operate at temperatures above the melting or solubilization temperature of the polymer. The latter are referred to as "solution" processes.

A preferred process for the polymerization of α-olefins is the high temperature or "solution" polymerization process, an example of which is described in Canadian Pat. No. 660 869 of A. W. Anderson, E. L. Fallwell and J. M. Bruce, which issued Apr. 9, 1963. In a solution process, the process is operated so that both the monomer and polymer are soluble in the reaction medium.

Solution polymerization processes are operated at pressures above atmospheric pressure. It is necessary, in order to recover polymer, to reduce the pressure to atmospheric pressure and to separate the hydrocarbon solvent from the polymer. One method of accomplishing the pressure reduction and polymer separation is to pass a solution of polymer and hydrocarbon solvent, at a temperature above the melting point of the polymer and a pressure above atmospheric pressure, through a pressure reduction valve to reduce the pressure to substantially atmospheric pressure. As the solution is passed through the pressure reduction valve, solvent is flashed off from the polymer to give a polymer containing relatively minor amounts of solvent, such polymer being in the form of molten polymer. However, in such a method some polymer may become entrained in the hydrocarbon solvent being flashed off and may become deposited on the walls of the vessel being used for separation of solvent from polymer. Such deposited polymer is at a temperature above the melting point of the polymer. There is a tendency for the deposited polymer to degrade, and hence form gel particles, over a period of time. The molten polymer in the vessel may become contaminated with such gel particles especially when degraded polymer separates from the walls of the vessel and becomes admixed with the molten polymer.

An intermediate separator in which the pressure is reduced from the pressure of the polymerization reaction to a lower pressure that is greater than atmospheric pressure may be employed between the reactor and the method used to separate polymer from solvent, as is disclosed in Canadian Pat. No. 568 721 of E. D. Johnson, which issued Jan. 6, 1959.

A method of reducing the tendency for the formation of gel in the separation of polymer from solvent in a solution polymerization process has now been found.

Accordingly, the present invention provides in a process for the separation, in a solution process for the manufacture of polymers of ethylene selected from the group consisting of homopolymers of ethylene and copolymers of ethylene and higher α-olefins, of a solution comprising said polymer and inert hydrocarbon solvent into fractions comprising said polymer and said solvent, said solution being at a temperature above 130° C. and at a pressure above atmospheric pressure, wherein the pressure of said solution is reduced by passing said solution through pressure reduction means and into a substantially vertical elongated vessel, such that the solution passes into the vessel in a downward direction, said polymer forming a pool of molten polymer below said pressure reduction means and said solvent passing in the form of a vapour from the top of said vessel, the walls of said vessel being maintained at a temperature above the melting point of the polymer, the improvement comprising maintaining the walls of the vessel in the region above said pressure reduction means at a temperature that is at least 10° C. higher than the temperature of the remainder of the walls of the vessel.

In a preferred embodiment of the process of the present invention, the temperature of the walls above the valve is at least 30° C. higher than the temperature of the remainder of the walls.

The present invention is directed to a solution polymerization process for the preparation of high molecular weight polymers of ethylene. In particular, the polymers are homopolymers of ethylene and copolymers of ethylene and higher α-olefins, especially such higher α-olefins having 3 to 12 carbon atoms, i.e., $C_3$-$C_{12}$ α-olefins, including bicyclic α-olefins, examples of which α-olefins are butene-1, hexene-1, octene-1, and bicyclo-(2,2,1)-2-heptene. In addition, cyclic endomethylenic dienes may be fed to the process with the ethylene or mixtures of ethylene and $C_3$-$C_{12}$ olefin.

In a solution polymerization process monomer(s), a co-ordination catalyst and inert hydrocarbon solvent are fed to a reactor. Co-ordination catalysts for solution polymerization processes are known, for example, those described in the aforementioned Canadian Pat. No. 660 869. The monomer may be solely ethylene or a mixture or ethylene and one or more of the higher α-olefins and is dissolved in the reaction solvent.

Solution polymerization processes may be operated at temperatures in the range of about 100°–320° C. and especially in the range 105°–310° C. The pressures used in the process of the present invention are those known for solution polymerization processes, especially in the range of about 4–25 MPa. The pressure and temperature are controlled so that both the unreacted monomers and the polymer formed remain in solution, a requirement of a solution polymerization process.

The hydrocarbon solvent used in the polymerization process is a hydrocarbon solvent that is inert with respect to the co-ordination catalyst. Such solvents are known and include hexane, heptane, octane, cyclohexane, methylcyclohexane and hydrogenated naphtha. The solvent used in the polymerization process is preferably used in the preparation of the co-ordination catalyst. The hydrocarbon solvent is the major component of the polymerization mixture fed to the reactor, usually comprising at least 75% of the reaction mixture.

The mixture that exits from the polymerization reactor comprises polymer, unreacted monomer, co-ordination catalyst, some of which remains in an active state, and hydrocarbon solvent. The polymerization reaction in a solution polymerization process is normally terminated by addition of a so-called "deactivator", for example, a fatty acid, an alcohol or an alkaline earth metal/carboxylic acid salt. The deactivator is admixed with hydrocarbon solvent, normally the solvent of the polymerization process, and fed into the polymerization mixture, usually shortly after that mixture passes from the reactor. The polymerization mixture that has been treated with deactivator contains catalyst residues which may be removed by contacting the mixture with an adsorbent, for example, alumina. Such a deactivation and catalyst removal process is described in Canadian Pat. No. 732 279 of B. B. Baker, K. M. Brauner and A. N. Oemler, which issued Apr. 12, 1966.

Subsequently, the polymerization mixture is subjected to one or more steps to reduce the temperature and pressure of the polymerization mixture to atmospheric pressure and temperature. In a solution polymerization process this is normally done by first reducing the pressure to atmospheric pressure in one or more steps and subsequently cooling the molten polymer until it solidifies, usually in the form of pellets. A method for reducing the pressure in the process that may be used, in part, is that described in the aforementioned Pat. No. 568 721.

BRIEF DESCRIPTION OF THE DRAWINGS

The present invention will be further exemplified with reference to the following drawings:

Referring to FIG. 1, the apparatus used in conjunction with a process of the present invention comprises an upper vessel 1 and a lower vessel 2. Both upper vessel 1 and lower vessel 2 are elongated vessels with upper vessel 1 being located above lower vessel 2. Upper vessel 1 and lower vessel 2 are joined at sieve plate 3, sieve plate 3 being adapted to pass molten polymer. Upper vessel 1 has heating coils 4, 5, and 6 passing around the vessel. Heating coil 4 spirals around the upper portion of upper vessel 1 a plurality of times in order that that portion of upper vessel 1 may be heated in a controlled manner. Similarly heating coils 5 and 6 spiral around the middle and lower portions, respectively, of upper vessel 1. In addition heating coil 7 spirals around lower vessel 2 a plurality of times in order that that vessel may be heated in a controlled and uniform manner. Upper vessel 1 and lower vessel 2, together with heating coils 4–7, are insulated by means not shown. Each of heating coils 4, 5, 6, and 7 is connected to a source of steam through steam pipes 9, 10, 11 and 12 respectively.

Figure 1:
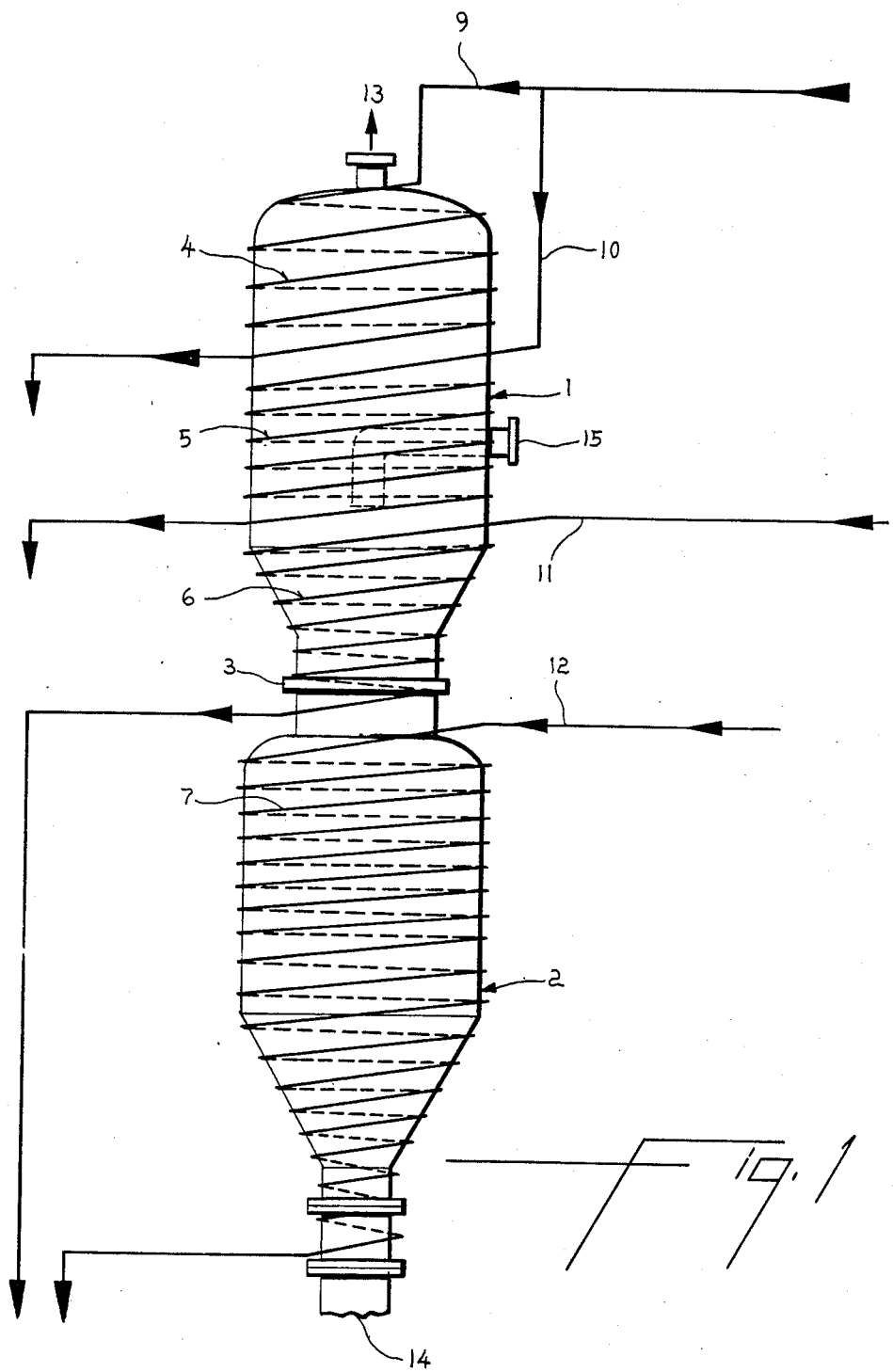
FIG. 1 is a schematic representation of apparatus for the separation of polymer from solvent.

Solution inlet 15 is located in upper vessel 1. As is shown in FIG. 1, heating coils 4 and 5 are located at and above solution inlet 15. Heating coils 4 and 5 are both located above melt pool 16 (see FIG. 2). Each of heating coils 4, 5, 6 and 7 has an outlet (not shown) for removal of condensate from the steam-heated coils.

Vapour outlet 13 is located in the upper portion of upper vessel 1 and polymer outlet 14 is located at the bottom of lower vessel 2.

Figure 2:
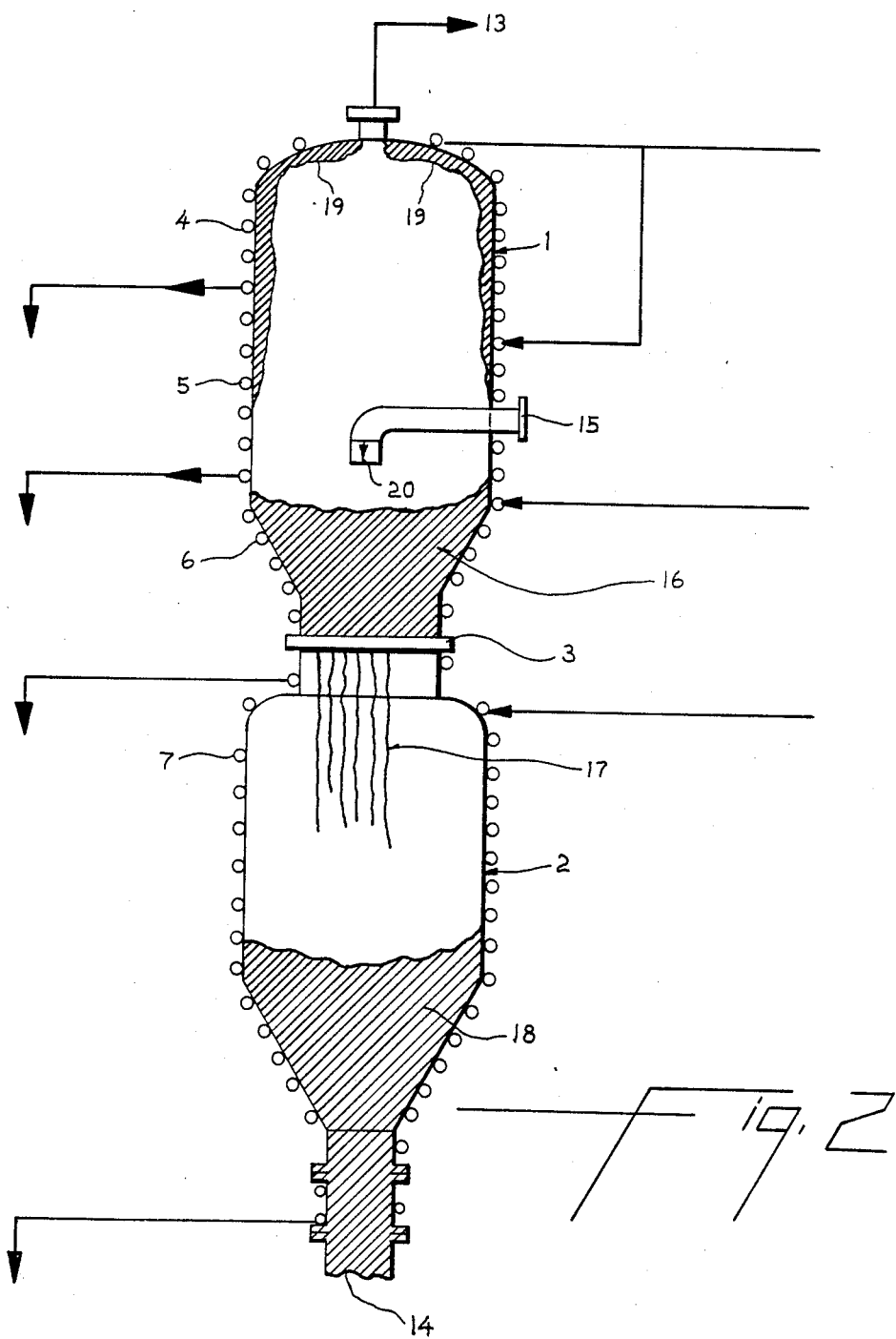
FIG. 2 is a cross-section of the apparatus of FIG. 1.

Referring to FIG. 2, solution inlet 15 passes into upper vessel 1 to a position that is axially located within upper vessel 1. The outlet of solution inlet 15 i.e. nozzle 20 of a pressure reduction valve (not shown), is adapted to axially discharge solution passing therethrough in a downward direction into upper vessel 1. A melt pool 16 is located below the outlet of solution inlet 15 and above sieve plate 3, melt pool 16 being spaced apart from said outlet.

The pressure reduction means may comprise a pressure reduction valve located within upper vessel 1 or, preferably, a pressure reduction valve located outside upper vessel 1 in fluid-flow relationship with nozzle 20 which is located within upper vessel 1 and adopted to discharge solution in a downward direction.

Although the present invention has been particularly described with reference to the use of heating coils to heat and control the temperature of the vessels, it will be understood by those skilled in the art that other heating and control means may be used e.g. heating jackets, electric coils and the like.

In operation a solution of polymer in solvent passes through solution inlet 15 and is discharged from nozzle 20 into upper vessel 1. The solvent is flashed off and the vapour thereof passed through vapour outlet 13 to a condenser (not shown). The polymer forms melt pool 16. The polymer of melt pool 16 flows through sieve plate 3, forming polymer strands 17 which fall into melt pool 18 in the bottom of lower vessel 2. The polymer of melt pool 18 passes through polymer outlet 14 to, for example, an extruder (not shown) adapted to form said polymer into solid pellets of polymer.

As the solvent is flashed off from the solution of polymer in solvent, polymer may become entrained in the solvent vapour. Such entrained polymer may in turn become deposited on the walls of upper vessel 1, especially said walls located above solution inlet 15. Such deposited polymer 19 is shown in FIG. 2.

In the process of the present invention the walls of upper vessel 1, located above solution inlet 15 i.e. the walls heated by heating coils 4 and 5, are maintained at a temperature that is at least 10° C., and especially at least 30° C., higher than the temperature of the remainder of said walls of upper vessel 1. Even though it is known that homopolymers of ethylene and copolymers of ethylene and higher α-olefins degrade at a faster rate as the temperature of the polymer is increased, the example hereinafter shows that the use of the higher wall temperatures actually results in a decrease in degraded polymer as measured by the length of the periods during which polymer of acceptable gel content is manufactured.

The present invention is illustrated by the following example.

EXAMPLE 1

A commercial-scale process for the manufacture of homopolymers of ethylene and copolymers of ethylene and higher α-olefins was operated using a pressure reduction system of the type shown in the drawings. When the process was operated with the walls of upper vessel 1 at the same temperature i.e. heating coils 4, 5 and 6 operating at the same temperature, it was found that the gel content of the polymer obtained normally remained at acceptable levels for about 3 to 4 months, it being necessary to manually clean the vessel when the gel content of the polymer became unacceptable. However when the temperature of heating coils 4 and 5 was increased by 50° C. it was found that the gel content of the polymer obtained normally remained at acceptable levels for about 7 to 10 months. Thus the use of the present invention resulted in a significant increase in the length of the average period during which the gel content of the polymer was acceptable.

I claim:

1. In a solution process for the manufacture of polymers of ethylene selected from the group consisting of homopolymers of ethylene and copolymers of ethylene and higher α-olefins, a process for the separation of a solution comprising α-olefin polymer and inert hydrocarbon solvent into fractions comprising said polymer and said solvent, said solution being at a temperature above 130° C. and at a pressure above atmospheric pressure, wherein pressure of said solution is reduced by passing said solution through pressure reduction means and into a substantially vertical elongated vessel, such that the solution passes into the vessel in a downward direction, said polymer forming a pool of molten polymer below said pressure reduction means and said solvent passing in a form of a vapour from the top of said vessel, the walls of said vessel being maintained at a temperature above the melting point of the polymer, the improvement comprising maintaining the walls of the vessel in the region above said pressure reduction means at a temperature that is at least 10° C. higher than the temperature of the remainder of the walls of the vessel.

2. The process of claim 1 in which the temperature of the walls above the valve is at least 30° C. higher than the temperature of the remainder of the walls.

3. The process of claim 3 in which the polymer is a homopolymer of ethylene.

4. The process of claim 3 in which the polymer is a copolymer of ethylene and higher α-olefin.

5. The process of claim 1 in which the hydrocarbon solvent is hexane or cyclohexane.

6. The process of claim 2 in which the hydrocarbon solvent is hexane or cyclohexane.

7. The process of claim 1 wherein the higher alpha-olefin has 3–12 carbon atoms.

8. The process of claim 2 wherein the higher alpha-olefin has 3–12 carbon atoms.

9. The process of claim 4 wherein the higher alpha-olefin has 3–12 carbon atoms.

10. The process of claim 5 wherein the higher alpha-olefin has 3–12 carbon atoms.

11. The process of claim 6 wherein the higher alpha-olefin has 3–12 carbon atoms.

* * * * *